United States Patent
Hod et al.

(10) Patent No.: US 7,205,995 B1
(45) Date of Patent: Apr. 17, 2007

(54) COMPUTER PROGRAM AND PROCESS WHICH MAKE IT POSSIBLE TO TRANSFORM ANY DIGITAL IMAGE INTO A FREE-HAND FINE ART PAINTING

(76) Inventors: Alon Hod, 1609 Shadow Ct., Dunwoody, GA (US) 30338; Tony Topaz, 5317 Manhasset Ct., Dunwoody, GA (US) 30338; Noam Small, 4557 Village Springs Pl., Dunwoody, GA (US) 30338

( * ) Notice: Subject to any disclaimer, the term of this patent is extended or adjusted under 35 U.S.C. 154(b) by 268 days.

(21) Appl. No.: 11/066,417

(22) Filed: Feb. 25, 2005

Related U.S. Application Data

(60) Provisional application No. 60/548,605, filed on Feb. 28, 2004.

(51) Int. Cl.
*G09G 5/00* (2006.01)
*G09B 11/00* (2006.01)
*G06K 9/00* (2006.01)
*G09B 11/10* (2006.01)
*G09G 5/02* (2006.01)

(52) U.S. Cl. ............. 345/581; 345/589; 345/592; 345/593; 345/597; 434/81; 434/85

(58) Field of Classification Search ........... 345/581, 345/585, 589, 592, 593, 597, 624, 630, 643, 345/22; 382/162, 165, 164; 434/81, 98, 434/84–85; 715/764
See application file for complete search history.

(56) References Cited

U.S. PATENT DOCUMENTS 6,168,438 B1 * 1/2001 Leonard et al. ............ 434/81
6,356,274 B1 * 3/2002 Spector ..................... 345/589

* cited by examiner

*Primary Examiner*—Wesner Sajous

(57) ABSTRACT

This invention is a computer program and process that make it possible for the novice or experienced crafter to convert any digital picture into a customize high quality painting. The crafter can choose the subject that he wants to paint (his children, a scanned pictures, an image from the internet, etc). He can choose the size of the painting, the pigments that he will like to use (acrylic, oil, markers etc), the surface (canvas, paper etc), and the level of complexity of his project. The invention generates a 'color in line' drawing and detailed instructions on how to accurately and artistically fill the drawing with paint in order to create a high quality fine art painting with likeness to the original digital picture.

1 Claim, 3 Drawing Sheets

COMPUTER PROGRAM AND PROCESS WHICH MAKE IT POSSIBLE TO TRANSFORM ANY DIGITAL IMAGE INTO A FREE-HAND FINE ART PAINTING

CROSS REFERENCE TO RELATED APPLICATIONS

This application claims the benefit of PPA No. 60/548,605 filed 2004 Feb. 28, by the present inventors.

FEDERALLY SPONSORED RESEARCH

Not applicable

SEQUENCE LISTING OR PROGRAM

The application contains a computer program listing appendix that includes two duplicate discs, containing a computers program of the preferred embodiment of the invention in ASCII code, in the files described below:

| FILE NAME: | SIZE: | 2,004,993 BYTES | DATE: Feb. 23, 2005 |
|---|---|---|---|
| P2PAcr_exe.txt | | | |
| FILE NAME: | SIZE: | 16,511 BYTES | DATE: Feb. 23, 2005 |
| Guderes_dll.txt | | | |
| FILE NAME: | SIZE: | 1,423 BYTES | DATE: Feb. 23, 2005 |
| Frames_dll.txt | | | |

BACKGROUND OF THE INVENTION

1. Field of Invention

This invention relates to computerized tools, which help to paint fine art paintings, specifically to transform a digital picture into a customized 'Paint by Number' style high quality painting.

2. Prior Art

Having a painter paint ones family portrait or ones favorite scenery on a large canvas is an expensive luxury that not everyone can afford. Painting that fine art piece your self requires talents and skills that most people don't have. Crafters, who want to express themselves in painting on canvas, paper, wood and many other surfaces, are limited to one's own abilities of drawing abstracts, live or still objects, and of animating them with paint or other pigmented mediums. A common solution to enable crafters to express themselves in painting are the "Paint by Numbers" style crafting kits, which provide crafters with "color-in line" drawings for them to fill in. These kits offer crafters a limited number of non-original artifacts to create (usually one per kit). Further, un-like free-hand painting, the "Paint by Numbers" method limits the crafters to pre-determined subjects, paints, tools, surfaces and sizes, and as a result, the finished paintings created with 'paint by number' kits are simple and somewhat childish.

Solutions to this problem, some of them in a form of a computer program, have been focusing primarily on image manipulation, the methods for transferring a color picture into inline drawing, while leaving the crafters on their own when it comes to the actual drawing and painting steps.

To create a high quality life-like painting one needs to mix paints. A crafter cannot achieve a highly artistic result when using pre-maid paints from the store, because pre-maid paints cannot imitate exactly the desired colors of the objects one wants to paint. For instance, to achieve a certain skin color of a girl in a picture, one has to mix several ready-made colors in order to match the exact desired shade of skin color. Mixing paints to achieve the right color requires 'good eye', talent, knowledge and experience.

U.S. Pat. No. 6,356,274 to Spector (2002 Mar. 12) discloses a kit of computer program and set of markers, which is intended for children. The program accepts a digital image as input, and prints a sheet of paper with outline for a child to color. This patent holds the typical disadvantages of the 'Paint by Number' method. It produces only a printer paper size drawing and the colors are limited to the pre-determined set of markers. This patent does not faithfully reproduce the full range of colors included in a color picture, but only approximate these colors, so the result is a very basic form of painting—simple and childish.

U.S. Pat. No. 6,252,996 to Putnam (2001 Jul. 26) discloses a method for transformation of a photographic picture into templates for painting. This patent only produces templates, while leaving the crafters on their own when it comes to the actual drawing and painting steps. Most crafters will encounter difficulties when trying to match the right paints and their mixes to the regions of the template, in order to achieve likeness to the original digital picture. It is almost impossible for the average crafter to create a high quality painting with likeness to the original picture without getting guidance on how to mix paints and apply them to the different color regions of the painting.

Since the present invention uses a computer to convert a digital picture into a line drawing, of prior art interest are line drawing conversion software that are in the market, such as Adobe Photoshop by Adobe Inc.

OBJECTS AND ADVANTAGES

As there is no solution known to us in the prior art to answer the need of crafters to create a life-like artistic painting with likeness to an original picture, a. An object of this invention is to provide a computer program and process that make it possible for the novice or experienced crafter to convert any digital picture into a customize high quality painting. The advantage of this invention is that it guides the crafter how to create a high-scaled life-like 'professional looking' painting, with likeness to an original picture.

The crafter can choose the subject that he wants to paint (his children, dog, a picture he scans, an image from the internet, etc). He can choose the size of the painting, the pigments that he will like to use (acrylic paints, oil, markers etc), and the surface (canvas, paper etc). The crafter can also choose the level of complexity for his painting (number of color shades in the painting).

b. More particularly, an object of this invention is to provide a system that converts a digital picture into a line—drawing where color regions define zones to be painted. The size of the line drawing and its complexity (number of different color regions) is as determined by the crafter. The system will print the line drawing on several sheets of paper in accordance with the size of the desired painting, and will direct the crafter how to arrange the papers and trace them onto the chosen surface.

c. Another object of this invention is to provide the crafter with a shopping list of materials recommended for his project, including a list of the paints and quantities that the crafter will need in order to complete the painting project.

d. Another object of this invention is to simulate the painting on the computer's screen and to direct the crafters how to paint each color region of the painting.

In the preferred embodiment of the invention, the program highlights all the regions that share the same color and guides the user on how to achieve that exact color by mixing leading brands paints. (For instance, if the user chose to paint with acrylic paints, a recipe for mixing paint might be: '5 parts Cadmium Yellow Medium'+1 part Permanent Green Light'+10 parts White).

The user may also click with the computer's mouse on any color region of the painting on the screen, and the system will tell him the formula for mixing that region's color.

e. Another object of this invention is to help the crafter choose the right frame for the finished painting.

The system will simulate the painting on the computer's screen with different options of frames, so that the crafter can choose the frame (style, color) that fits his painting best.

Still further objects and advantages will become apparent from the following description of the invention.

SUMMARY

This invention is of a computer program and process that make it possible for a user to transform a digital picture into a free-hand fine art painting.

DRAWINGS

Referring to the drawings that accompany this invention's description,

REFERENCE NUMERALS

Figure 1:
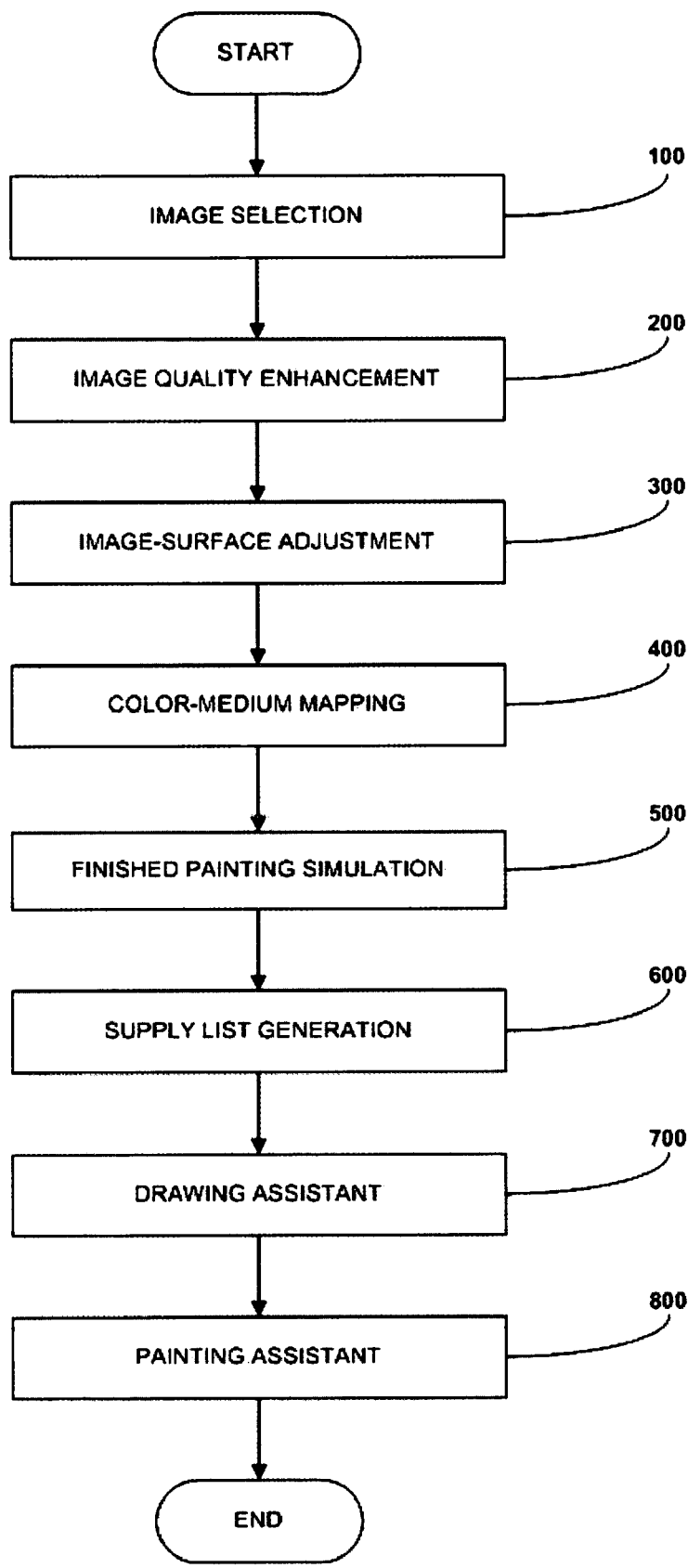
FIG. 1 is a workflow diagram of the overall process, method and computer program.
Figure 2A:
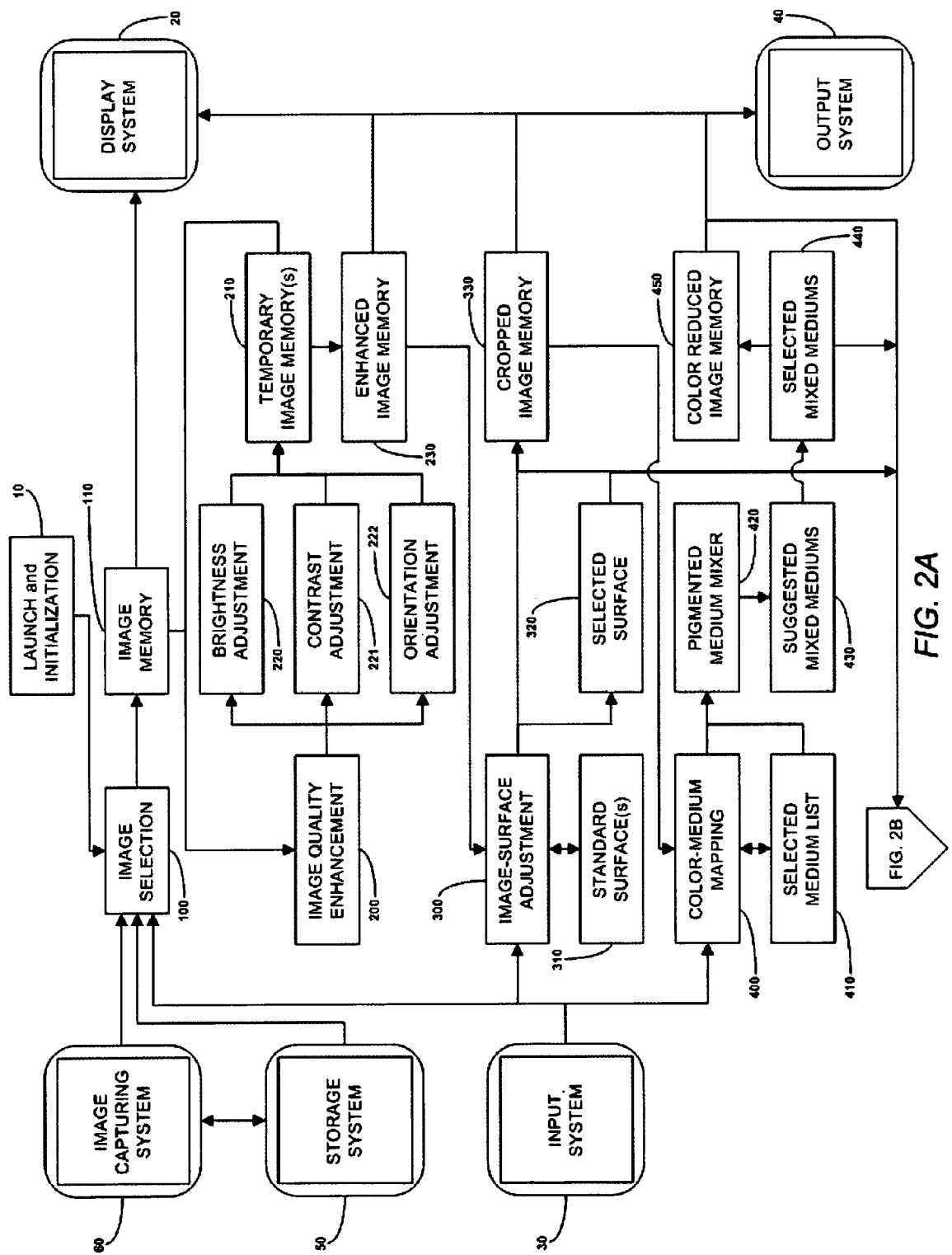
FIG. 2A and FIG. 2B are detailed data flow diagrams of the said computer program.
Figure 2B:
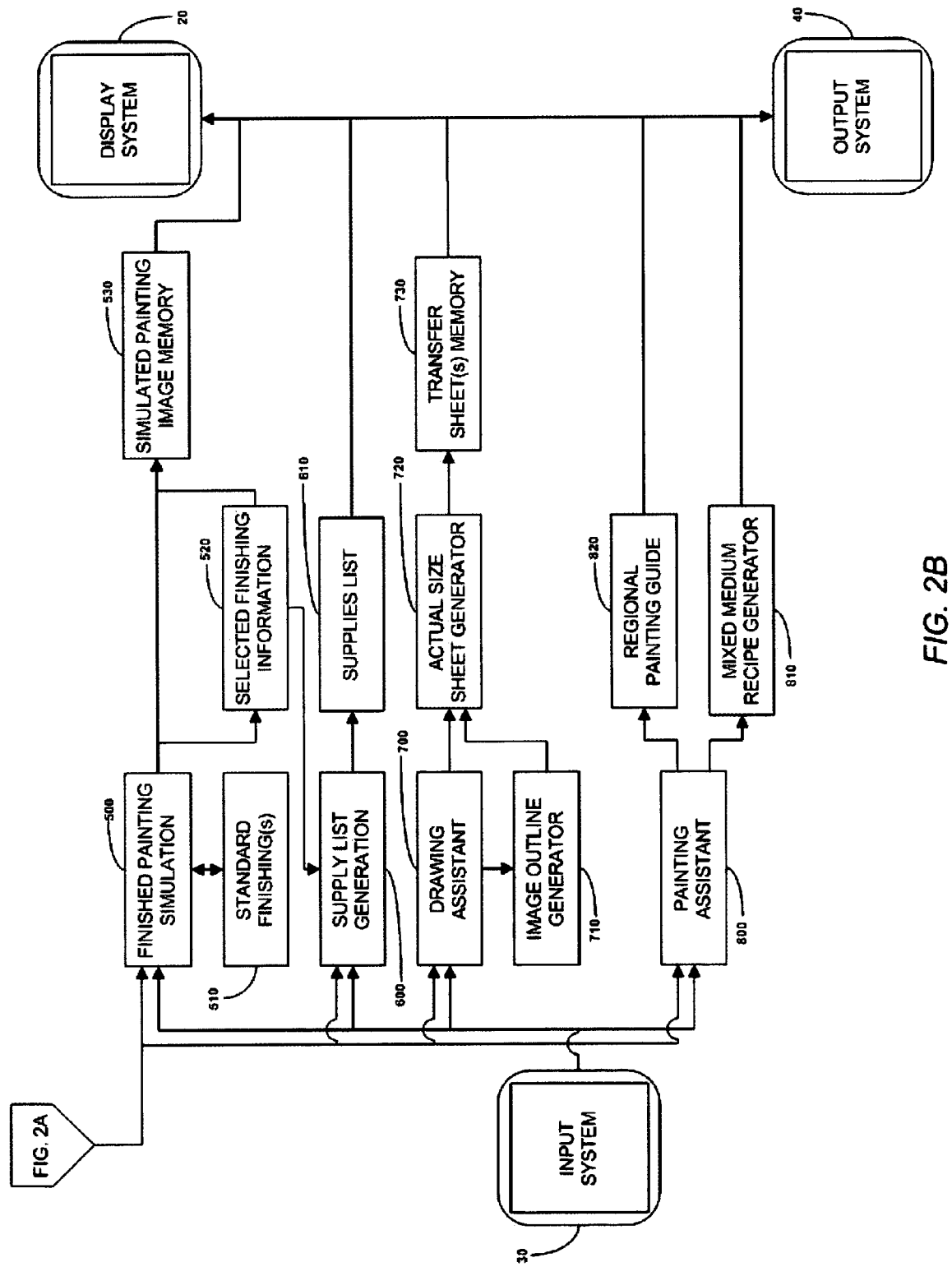

Referring to the numerals in the drawings that accompany this invention's description, 10—A Free-hand Painting computer program comprises of the following sub-systems and modules:
  20—A Display Sub-System
  30—An Input Sub-System
  40—An Output Sub-System
  50—A Storage Sub-System
  60—An Image Capturing Sub-System
  100—An Image Selection module comprises of:
    110—An Image Memory storage
  200—An Image Quality Enhancement module comprises of:
    210—A Temporary Image Memory storage(s)
    220—A Brightness Adjustment Filter
    221—A Contrast Adjustment Filter
    222—An Orientation Adjustment Filter
    230—An Enhanced Image Memory storage
  300—An Image-Surface Adjustment module comprises of:
    310—A Standard Surface Definition List
    320—A Selected Surface Definition storage
    330—A Cropped Image Memory storage
  400—A Color-Medium Mapping module comprises of:
    410—A Selected Medium List
    420—A Pigmented Medium Mixer
    430—A Suggested Mixed Mediums List
    440—A Selected Mixed Mediums List
    450—A Color Reduced Image Memory storage
  500—A Finished Painting Simulation module comprises of:
    510—A Standard Finishing Information List
    520—A Selected Finishing Information storage
    530—A Simulated Painting Image Memory storage
  600—A Supply List Generation module comprises of:
    610—A Supplies List
  700—A Drawing Assistant module comprises of:
    710—An Image Outline Generator
    720—An Actual Size Transfer Sheet Generator
    730—A Transfer Sheet Memory storage(s)
  800—A Painting Assistant module comprises of:
    810—A Mixed Medium Recipe Generator
    820—A Regional Painting Guide

DETAILED DESCRIPTION OF INVENTION

A computer program and process which make it possible to convert any digital image into a painting, comprising of the following modules and steps:

The Free-hand Painting computer program 10 goes through an initialization phase to set the appropriate operating mode of different physical input/output systems available on the computer, such as monitor, keyboard and mouse. The program is communicating to each physical system on the computer via the appropriate internal sub-system governing the operation of the underlying physical system. The Display Sub-System 20 is set to display the preferred embodiment computer program's screens on the computer's monitor and to provide visual guidance of the process to the user. The Input Sub-System 30 is set to capture user input and selection from both the computer's keyboard and mouse. The Output Sub-System 40 is set to output all relevant process guiding to the computer's printer. The Storage Sub-System 50 is set to store and retrieve digital images and other supporting digital data appropriate for the preferred embodiment of the computer program to and from the computer's external storage media, such as hard-disks and CD-ROMs. The Image Capturing Sub-System 60 is set to capture and retrieve digital images from an optionally connected digital camera or a digital scanner. Once all sub-systems are properly set by this initialization phase, the computer program is ready to execute the process and method in an interactive way, which is simple enough for any user to follow and control.

Using the Image Selection module 100 the user selects a digital image from any digitally available source, including local disk storage of ready made painting projects, local disk storage of collected digital images, local Picture CDs of developed photo film, captured images from digital cameras or scanners, and electronically downloaded images from Internet websites, electronic mail (e-mail) or instant messaging networks (IM), or file sharing networks (P2P). The image may be of any digital format, and of any physical size, resolution, and color depth or detail level suitable to describe a subject of a painting, including photographs, digital art or combinations of both of them. Once an image is selected, its information is loaded into the Image Memory storage 110 residing in the computer's RAM, and is stored there in full-depth, maximum-resolution pixel map representation.

Using the Image Quality Enhancement module 200 the user may modify the digital appearance of the selected image stored in the Image Memory 110 using available common digital filters such as the Brightness Adjustment Filter 220, the Contrast Adjustment Filter 221 and the Orientation Alignment Filter 222. The output of the digital filters is stored into one of the available Temporary Image Memory units 210, allowing the user to undo each filter application should its result isn't to their likings. The combined output of all filter applications is stored back into the Enhanced Image Memory 230.

Using the Image-Surface Adjustment module 300 the user may crop the image stored in the Enhanced Image Memory 230 to contain only portions desirable for the painting and match the resulting cropped image to the surface to paint on. Users may choose surfaces from the Standard Surface Definition List 310, and adjust their visible margins and orientation, or may define custom surfaces, setting their dimension, visible margins and orientation. The invention can accommodate any surface of any practical size for painting. The information regarding the selected surface is stored in the Selected Surface Definition 320 and the cropped image is stored in the Cropped Image Memory 330.

Using the Color-Medium Mapping module 400 the system maps the digital representation of color information available within the Cropped Image Memory 330 and suggests selection of paints (or other pigmented mediums) and their mixes based on the user selectable painting style and application. The Pigmented Medium Mixer 420, will then output the Suggested Mixed Mediums List 430 based on the paints that are in the Selected Medium List (410). Users may fine-tune the list to their likings by adding, removing, or editing mixes from it. The Selected Mixed Mediums List 440 is then mapped onto the color information stored with the Cropped Image Memory storage 330 to generate and store its painting representation into the Color Reduced Image Memory storage 450.

Using the Finished Painting Simulation module 500 the user may preview a painting with a set of finishing options applied to it, including frames, matting, surface to surface matching (like wall hanging, if applicable to the surface) and color combinations. The user selects a finishing option from the Standard Finishing Information List 510 or inputs a custom choice of finishing options into the Selected Finishing Information storage 520 which is then rendered onto the Color Reduced Image Memory storage 450 to generate a simulated visual representation of the finished painting, stored in the Simulated Painting Image Memory storage 530.

The Supply List Generation module 600 collects all user inputs available from previous steps to generate a list of supplies, including materials and tools the user may need to finish the painting project. The list is stored in the Supplies List 610 together with details on suggested quantities, available sources, usage directions and other promotional and advertising material associated with each item.

Using the Drawing Assistant module 700 the user renders a collection of transfer sheets to be used as guidance when transferring a drawing of the Color Reduced Image Memory storage 450 onto the selected surface as indicated by the Selected Surface Definition storage 320. The Color Reduced Image Memory storage 450 is then input into the Image Outline Generator 710 to produce an estimated outline of colored regions. The result is then rendered with, depending on user input, the Color Reduced Image Memory storage 450 and input into the Actual Size Transfer Sheet Generator 720 to generate a collection transfer sheets into any of the available Transfer Sheet Memory storage(s) 730, wherefrom the user may select which to print out. The user transfers the Color Reduced Image Memory storage 450 onto the selected surface by arranging the transfer sheets over the selected surface and tracing over them. Any common method for transfer may be used in this process, ranging from placing a graphite transfer paper in-between the transfer sheet and the selected surface, to printing on pressure induced or heat induced transfer sheets.

The Painting Assistant module 800 provides the user with detailed instructions on how to cover the drawing on the selected surface with paints (or other pigmented mediums) and their mixes (whenever applicable to the pigmented mediums)—this may include using any of the suggested tools from Supplies List 610 or combinations thereof, like brushes, mixing cans and paints. While painting, the user is presented with the Color Reduced Image Memory storage 450 and the Selected Mixed Mediums List 440 as they are processed by the Regional Painting Guide 820 to generate a list of steps needed to cover each region with the appropriate mixed medium from the list. Each mixed medium is processed, according to user input, by the Mixed Medium Recipe Generator 810 for a visual mixing recipe for the user to achieve the color of the mix.

PREFERRED EMBODIMENT

There are many alternative ways that the free-hand painting computer program and process can be implemented and used, however there is one preferred embodiment, in the form of a computer program, which makes the process easy to follow by any person, and is described below:

a. The preferred embodiment of the Image Selection module 100 is presented in a form of an image browser, comprising the ability to browse relevant digital images from all digitally connected sources, including but not limited to local image and project files, captured digital images from digital cameras and scanners, or the Internet.

b. The preferred embodiment of the Image Quality Enhancement module 200 is presented in a form of an image editor, comprising the ability to adjust the quality of digital images using industry standard filters, including but not limited to brightness, contrast and orientation. Filters may be applied consecutively to further increase the overall quality of the selected image.

c. The preferred embodiment of the Image-Surface Adjustment module 300 is presented in a form of an adjustable cropping frame combined with a list of standard and custom surfaces. The cropping frame guarantees a proportional matching between the surface, its size and the original image, regardless of the actual dimensions of the cropped image.

d. The preferred embodiment of the Color-Medium Mapping module 400 is presented in a form of a color reduced image with its colors matched to paint mixes, and their recipes, as affected by the user selected base paints palette. In addition to a user selected base paints palette, the user may also input a complexity ratio as a controlling input over the Pigmented Medium Mixer, adjusting its resolution and limiting number of resulting mixes. This results in adjusting the level of details in the painting, which in turn affects the complexity and the length of the painting project.

e. The preferred embodiment of the Finished Painting Simulation module 500 is presented in a form of a framed painting and lists of possible frame, mats and colors, allowing the user to pre-determine painting qualities as a finished product.

f. The preferred embodiment of the Supply List Generation module 600 is presented in a form of a list of items the user may need to finish the custom painting project. Listed items may be priced, ordered online or further detailed and explained, from sources available online or locally within the computer program.

g. The preferred embodiment of the Drawing Assistant module 700 is presented in a form of adjustable collection of transfer sheets, forming an actual size image matching the painting surface, and including a color in-line drawing to simplify the transfer of the image onto the selected surface. The user may select sheets to print for transfer; with any one of the many techniques listed above, or visually enhance the details of each sheet by zooming in and out while transferring the image onto the surface.

h. The preferred embodiment of the Painting Assistant module 800 is presented in a form of a color reduced image and paint recipes marking each colored region with its appropriate color and detailed mixing recipe. Each colored region may be highlighted to further distinguish it from surrounding regions, providing the user with additional guidance on filling in the region with the matched paint mixture, based on the analysis of the Color-Medium Mapping module 400.

ALTERNATIVE EMBODIMENTS

In addition to the preferred embodiment, the following list describes some alternative embodiments for the free-hand painting process, method and computer program:

a. Instead of using a computer program to guide the user throughout the process, the instructions can be embodied into a printed book or delivered as an electronic document such as PDFs or any other common electronic format.

b. Instead of using liquid pigmented mediums, like paints such as acrylics, oils, watercolors or gouache, the user can use colored markers, colored pencils, pastels, etc.

c. Instead of using fixed sized surfaces such as canvas or paper, the user can use any surface for painting, such as walls, wood, furniture, toys, etc.

d. Instead of using a quality-enhancing filter, or in addition to its usage, the user may use a style-enhancing filter, such as crosscuts, mosaics, etc.

e. Instead of using full color mixes, the user may select to match colors to a pre-defined list of available mediums or mix mediums in a pre-determined ratio (e.g., 1:1 ratio).

We claim that:

1. a process of using a computer to enable to convert a digital image into a painting while directing the user how to paint said painting, said process comprising of the following steps:
   a. providing means to feed said computer with any digital picture, and
   b. modifying, if needed, the digital appearance of said digital picture and enhancing the quality of said digital picture, and
   c. providing means to crop said digital picture to contain only portions desirable for painting, and
   d. matching the cropped digital picture to any selected surface which may be of any size or material, and
   e. determining list of paints or other pigmented mediums and their mixes to be mapped onto the different colors regions of the picture, and
   f. simulating the finished painting on the computer screen for purposes of previewing said finished painting with a set of finishing options applied to it, including frames, matting, surface to surface matching and color combinations, and
   g. generating a supply shopping list that details the materials, tools and paints, including quantities, that are needed for painting said painting, and
   f. printing line drawings on a collection of sheets of papers to be arranged on said selected surface for tracing and transferring said line drawings onto the surface, and
   h. generating detailed instructions on how to cover said line drawing on said surface with paints or other pigmented mediums, including formulas how to mix pre-made paints in order to reach the appropriate color for each region on said line drawing,
   whereby a user can paint any object out of a digital picture on any surface of the user's choosing, and create a high quality 'professional looking' painting with likeness to the source digital picture.

\* \* \* \* \*